United States Patent [19]

Sugita

[11] Patent Number: 4,503,371
[45] Date of Patent: Mar. 5, 1985

[54] MASS DRIVER CIRCUIT FOR WEAVING LOOMS

[75] Inventor: Katsuhiko Sugita, Ishikawa, Japan

[73] Assignee: Tsudakoma Kogyo Kabushiki Kaisha, Japan

[21] Appl. No.: 438,359

[22] Filed: Oct. 21, 1982

[51] Int. Cl.³ .............................................. H02P 5/34
[52] U.S. Cl. ...................................... 318/443; 307/73
[58] Field of Search ............... 318/443, 110, 440, 441, 318/105, 106, 444; 363/174, 175, 176; 307/73, 80, 87

[56] References Cited

U.S. PATENT DOCUMENTS

| | | | |
|---|---|---|---|
| 525,690 | 9/1894 | Bradley | 307/73 X |
| 716,101 | 12/1902 | Potter | 307/73 X |
| 1,810,227 | 6/1931 | Shea | 318/231 X |
| 2,137,990 | 1/1936 | Rossman | 363/174 |
| 2,686,895 | 8/1954 | Feldhausen | 318/443 |
| 2,773,231 | 7/1954 | Adriansen et al. | 318/443 |
| 3,373,313 | 3/1968 | Prines et al. | 307/73 X |
| 3,980,170 | 9/1976 | Jakes et al. | 318/85 |
| 4,345,196 | 8/1982 | Hanyu et al. | 318/441 X |

OTHER PUBLICATIONS

*General Electric Technical Information*, "Spotting Equipment for Synchro. Motors", GET-1722C, General Electric Co., Nov. 1966.

Primary Examiner—William M. Shoop
Assistant Examiner—Bentsu Ro
Attorney, Agent, or Firm—Lerner, David, Littenberg, Krumholz & Mentlik

[57] ABSTRACT

A drive motor for each loom is selectively connected to a given commercial frequency power source for high speed rotation at normal running of the loom and to a low frequency power unit for low speed rotation at inching operation, thereby assuring accurate inching operation with cheap cost on looms under mass drive condition.

4 Claims, 7 Drawing Figures

4,503,371

MASS DRIVER CIRCUIT FOR WEAVING LOOMS

BACKGROUND OF THE INVENTION

The present invention relates to a mass driver circuit for weaving looms, and more particularly relates to improvement in construction of a driver circuit for accurate inching operation on weaving looms.

When a trouble such as yarn breakage of unsuccessful weft insertion occurs during normal running of a loom, the loom is either manually or automatically stopped and inching operation is performed in order to move the crank to a position suited for work to remove the cause of the trouble and/or weaving defects resulted from such a trouble.

One conventional electric circuit for such inching operation includes a push button switch which is given in the form of a manually operable, self-returnable contact so that electric power should be supplied to the drive motor for the loom as long as the push button switch is turned on. That is, the loom is driven for inching operation by turning on the push button switch for prescribed length of period so that the crank should be moved to a desired position.

Alternating current motors such as induction or synchronous motors are in general used for drive of looms, and such a drive motor is connected, for rotation, to an electric power source which delivers electric power of commercial frequencies. Such an electric power source is called "a commercial frequency power source" and will hereinafter be described as "a CF power source". So, once the CF power source to be used is fixed, the rotation speed of the drive motor per se is unchangeable. In order to obtain a desired running speed of the loom for which the drive motor is used, transmission ratio has to be changed in the power transmission coupling the drive motor to the crank shaft of the loom. More specifically, diameter of a pulley or pulleys used in the power transmission has to be changed.

With recent significant rise in running speed of looms, the diameter of pulleys for the power transmission has been increased accordingly. When the drive motor is connected to the CF power source also at inching operation on the loom under this condition, even short period turning-on of the push button switch results in relatively large rotation of the crank shaft due to the increased diameter of the pulleys, and the crank is moved past the desired position. In addition, since the push button switch is operated manually, turning-on period of the push button cannot be made shorter than a certain limit. So, it is now quite difficult to enable accurate inching operation on looms as long as manually operated push button switches are used.

It was proposed to use a pole-change type motor for drive of looms. In this case, the number of poles in the drive motor is increased at inching operation from that at normal running of the loom. This results in lower rotation speed of the drive motor and the loom is provisionally driven for slower running at inching operation.

Such a pole-change type drive motor, however, requires corresponding increase in number of coil windings which is inevitably accompanied with low efficiency. In addition, reduction in number of coil windings at normal running causes lowering motor efficiency. In order to cover the deficit, it is necessary to use a drive motor which can generate torque large enough to enable proper normal running of the loom. This inevitably connects to large construction of the loom. Further, since this system relies on change in number of poles in the drive motor, it is difficult to change rotation speed of the loom over a significantly wide range. So, in particular under high speed running condition, the rotation speed of the drive motor cannot be lowered enough at inching operation. In addition, change in rotation speed of the drive motor can be effected stepwise only, and, as a consequence, rotation speed of the drive motor cannot be adjusted continuously. So, it is difficult to move the crank of the loom always to a correct position at inching operation.

In most weaving factories, looms are divided into several groups depending on, for example, the type of product to be woven and a mass drive system is employed for each group. Under normal condition, only one or two looms in a group require concurrent inching operation. Despite this real condition, the above-described pole-change system requires that every loom should be provided with a switch circuit pole change. This apparently causes rise in the installation cost.

SUMMARY OF THE INVENTION

It is the object of the present invention to provide a cheap and small mass driver circuit which provisionally and selectively lowers, at inching operation, the crank shaft rotation speed accurately down to a desired level on a loom or looms in a given group which require inching operation.

In accordance with the present invention, a low frequency power unit is connected to a given CF power source and the drive motor of each loom is connected, selectively, to the output line of the CF power source via a start switch at normal running and to the output line of the low frequency power unit via an inching switch at inching operation of the loom, respectively. This selective connection is typically carried out by electric switching operation.

The low frequency power unit will hereinafter be described as "LF power unit", and may include an inverter circuit, a triac circuit or a motor-generator combination circuit.

DESCRIPTION OF THE PREFERRED EMBODIMENTS

Figure 1:
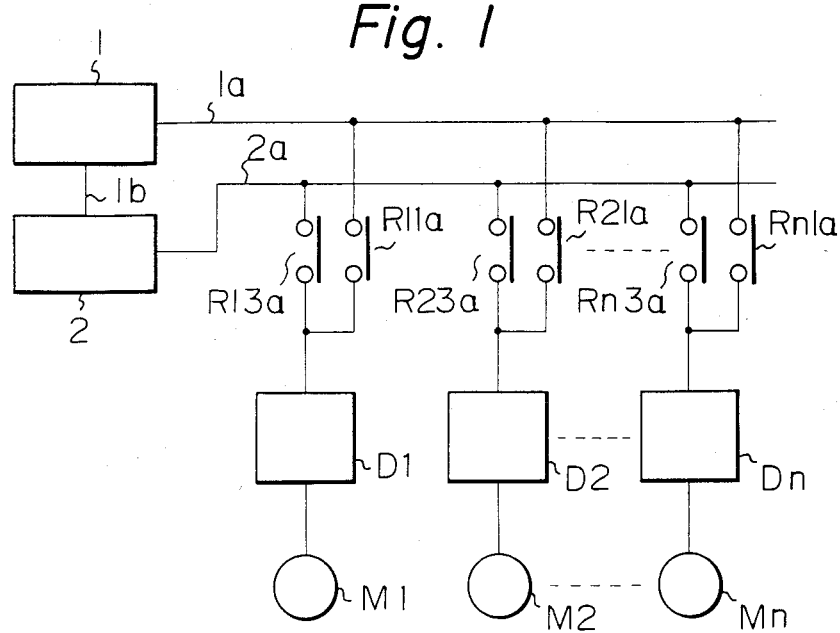
FIG. 1 is a block circuit diagram for showing the basic construction of the mass driver circuit in accordance with the present invention.

The present invention is advantageously applied to a group of weaving looms controlled by a mass drive system and each loom is, as described already, selectively connected to two kinds of power supply of different frequencies as shown in FIG. 1.

More specifically, a given CF power source 1 has two output lines 1a and 1b and the one output line 1b is connected to a LF power unit 2 having an output line 2a. The other output line 1a of the CF power source 1 is connected to driver circuits D1–Dn via relay a-contacts R11a–Rn1a whereas the output line 2a of the LF power unit 2 is also connected to the individual driver circuits D1–Dn but via different relay a-contacts R13a–Rn3a. The individual driver circuits D1–Dn are electrically connected to drive motors M1–Mn of the associated loom, respectively.

The drive motor is here given in the form of an induction motor and its output shaft is mechanically coupled to the crank shaft of the associated loom by means of a proper power transmission, usually, power is taken from a three-phase alternating electric power source whose output lines are each made up of three wires. In the illustration, however, the three wires are represented by one output line for simplification purposes. The LF power unit 2 delivers electric power whose frequency is lower than the given commercial frequency and chosen in accordance with the real condition of the inching operation.

The other output line 1a of the CF power source 1 is connected to a power transmission made up of, for example, pulleys and driven for rotation at different speeds during normal running and inching operation of the associated loom as later described in more detail.

Figure 2:
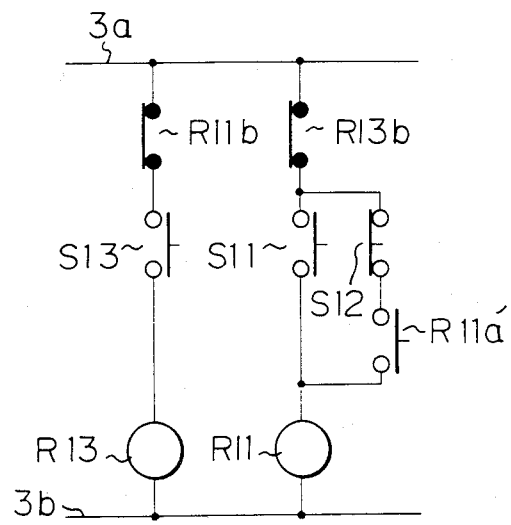
FIG. 2 is a circuit diagram of one example of the individual driver circuit arranged at each loom.

Different drive motors M1–Mn are accompanied with individual driver circuits D1–Dn of same construction. One example of the individual driver circuit D1 for the drive motor M1 is shown in FIG. 2, in which the individual driver circuit D1 is connected to a given common electric power source (not shown) by means of output lines 3a and 3b. The individual driver circuit D1 includes three sets of push button switches S11–S13 and two sets of relays R11 and R13 arranged between the output lines 3a and 3b.

More specifically, the first switch S11 is a normally open switch used for starting the drive motor M1, the second switch S12 is a normally closed switch used for stopping the drive motor M1, and the third switch S13 is a normally open switch used for the inching operation of the loom.

The one terminal of the start switch S11 is connected to the output line 3a via a relay b-contact R13b, which is normally closed, of the relay R13 whereas the other terminal of the start switch S11 is connected to the output line 3b via the relay R11. The one terminal of the stop switch S12 is connected also to the output line 3a via the relay b-contact R13b whereas the other terminal of the stop switch S12 is connected to the output line 3b via a relay a-contact R11a', which is normally open, of the relay R11 and the relay R11. The one terminal of the inching switch S13 is connected to the output line 3a via a relay b-contact R11b, which is normally closed, of the relay R11 whereas the other terminal of the inching switch S13 is connected to the output line 3b via the relay R13.

As the relay R11 is activated, the relay a-contacts R11a and R11a' are closed and the relay b-contact R11b opens. As the relay R13 is activated, the relay a-contact R13a is closed and the relay b-contact R13b opens.

Figure 3:
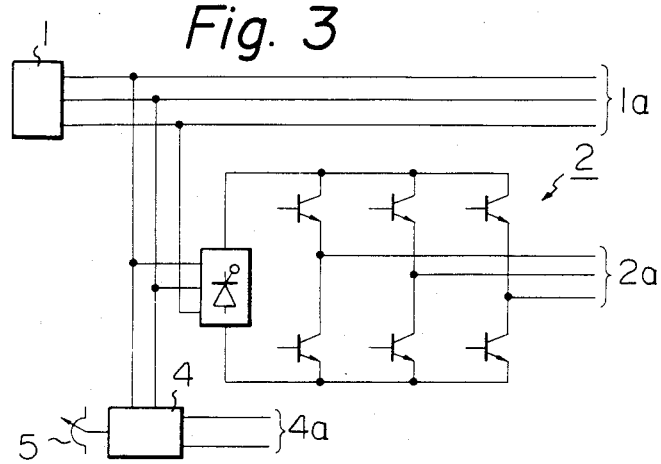
FIGS. 3 to 5 are circuit diagrams of various embodiments of the LF power unit advantageously usable for the mass driver circuit shown in FIG. 1, and FIGS. 6A and 6B are block circuit diagrams for showing the operation of the mass driver circuit shown in FIG. 1.

One embodiment of the LF power unit 2 used for the mass driver circuit in accordance with the present invention is shown in FIG. 3, in which the LF power unit 2 is given in the form of an inverter. The inverter converts alternating current power into direct current power which is then chopped at a frequency lower than the given commercial frequency for generation of low frequency alternating current power. The inverter is accompanied with a control circuit 4 having a frequency setter 5. The control circuit 4 generates on its output lines 4a base drive electric current.

When such an inverter is used for the LF power unit 2, it is advantageous to raise its voltage-frequency ratio (V/f) in order to increase the output torque. This is because the short inching period and variation in load on the loom necessitate large starting torque.

Figure 4:
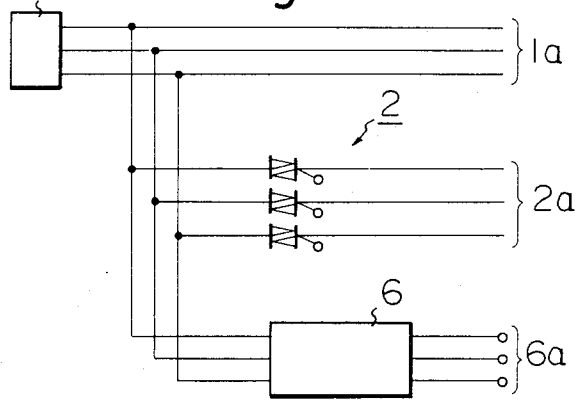

Another embodiment of the LF power unit 2 in accordance with the present invention is shown in FIG. 4, in which the LF power unit 2 is given in the form of a triac. The triac controls passage of alternating current half waves in order to generate mimic low frequency electric voltage. The triac is accompanied with a control circuit 6 which generates ignition pulses on its output lines 6a.

Figure 5:
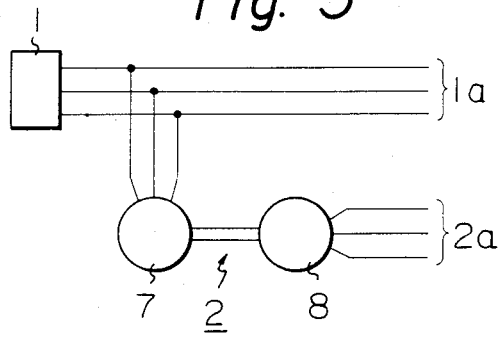

The other embodiment of the LF power unit 2 in accordance with the present invention is shown in FIG. 5, in which the LF power unit 2 is given in the form of a combination of a motor 7 with a generator 8. More specifically, the motor 7 is connected to the output line 1a of the CF power source 1 and the output shaft of this motor 7 is mechanically coupled to the generator 8 which is thereby driven for rotation for generation of low frequency electric voltage.

In practical application of the present invention, it is advantageous to use drive motors of a delta-star shiftable type. Delta connection is employed for the inching operation in order to lower the input voltage to the frequency converter below that of the CF power source without lowering the output torque, thereby enhancing voltage resistance of the frequency converter, i.e. the LF power unit.

With the above-described construction, the mass driver circuit in accordance with the present invention operates as follows. Since the operation is quite same for different drive motors M1–Mn, the first drive motor M1 is taken as an example.

Before running of the loom starts, the circuit assumes the condition shown in FIG. 1. This is, the relay a-contacts R11a, R11a' and R13a are both kept open. Further in FIG. 2, the start and inching switchs S11 and S13 are kept open and stop switch S12 is closed.

Figure 6A:
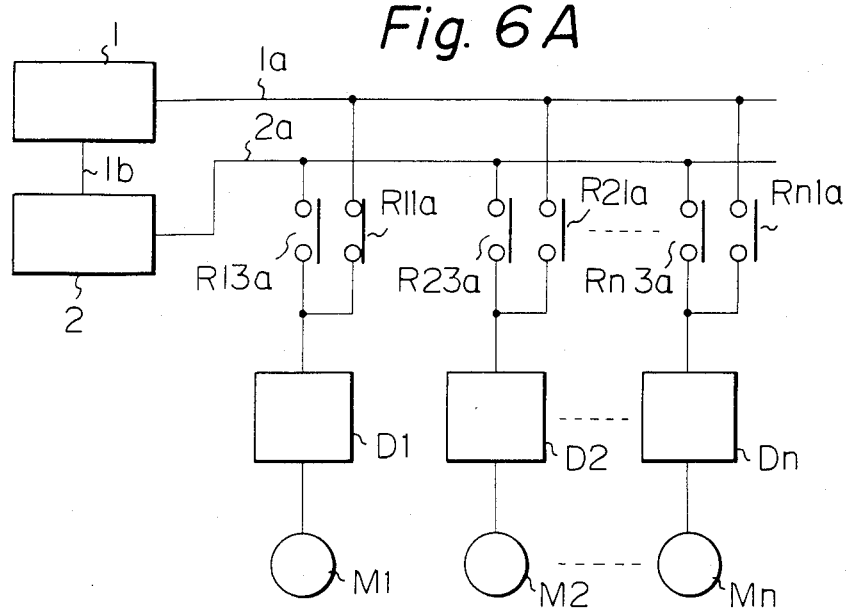

In order to initiate running of the loom, the start switch S11 is turned on. Then the relay R11 is activated and the relay a-contact R11a is closed so that the drive motor M1 should be connected to the CF power source 1 via the output line 1a. The drive motor M1 starts rotation in order to initiate running of the loom. Concurrently with this process, activation of the relay R11 closes the relay a-contact R11a' (see FIG. 2) so that activation of the relay R11 should be retained by self-holding if the start switch S11 is turned off. Activation of the relay R11 further opens the relay b-contact R11b so that the relay R13 should not be activated even if the inching switch S13 is unexpectedly turned on by error. This condition is shown in FIG. 6A.

When running of the loom has to be ceased due to occurrence of some trouble such as yarn breakage, the stop switch S12 is turned off. This is performed either manually or automatically. Then the self-holding for the relay R11 is cancelled and the activation is cancelled. This deactivation of the relay R11 opens the relay a-contacts R11a and R11a' and closes the relay b-contact R11b so that the entire circuit resumes the condition shown in FIG. 1. The drive motor M1 is now disconnected from the CF power source 1 and stops its rotation in order to cease the running of the loom.

Figure 6B:
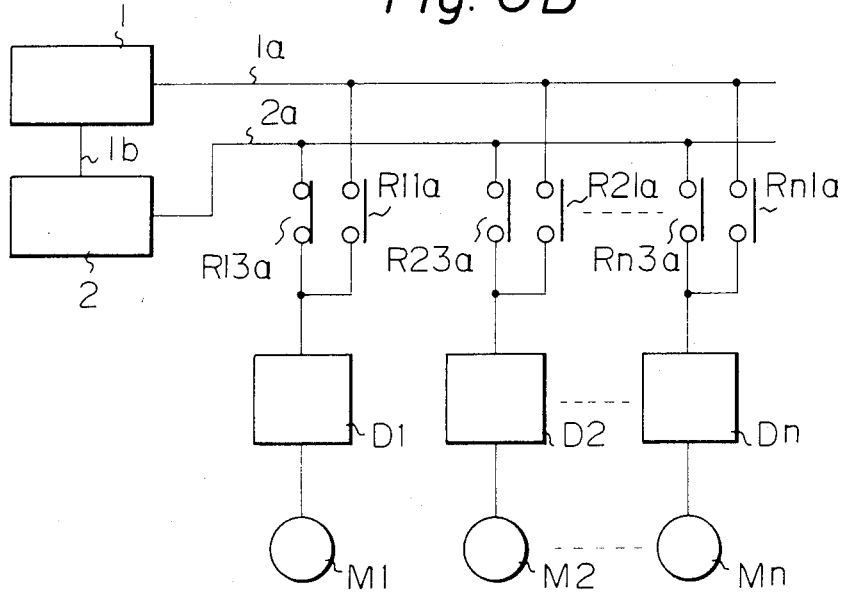

For inching operation, the inching switch S13 (see FIG. 2) is turned on under this condition. The relay R13 is thereby activated in order to close the relay a-contact R13a and open the relay b-contact R13b. Then, the drive motor M1 is connected to the LF power unit 2 via the output line 2a and driven for rotation at a speed lower than that for the normal running of the loom as long as the inching switch S13 is kept turned on. This condition is shown in FIG. 6B. Due to the open state of the relay b-contact R13b, the relay R11 should never be activated even when the stop switch S12 is turned on by error during the inching operation.

Thus, the loom is provisionally driven for inching operation at a speed lower than that for the normal running and the crank can be moved accurately to any desired positions by turning on the inching switch for a proper length of period. High rate of frequency conversion at the LF power unit 2 enables further significantly slow rotation of the drive motor so that further accurate positioning of the crank can be attained at inching operation.

After the correct position is obtained for the crank of the loom, the inching switch S13 is turned off in order to deactivate the relay R13. This deactivation of the relay S13 opens the relay a-contact R13a and closes the relay b-contact R13b so that the entire circuit should resume the condition shown in FIG. 1 in which the drive motor M1 is disconnected from the LF power unit 2. As a consequence, the loom ceases its inching operation.

After the cause for the trouble has been removed, the start switch S11 is again turned on so that the loom should initiate its normal running under the condition shown in FIG. 6A.

As described already, looms are usually divided into several groups under mass drive condition and, usually, each group contains only one or two looms which may require concurrent inching operation. So, no large capacity is required for the LF power unit, i.e. frequency converter, in accordance with the present invention. As a consequence, despite the general high cost of frequency converters on market, only insignificant installation cost is required for application of the present invention. Small capacity of the LF power unit naturally connects to low price and small construction of the entire mass driver circuit. Further, continuous frequency setting at the LF power unit can suffice any delicate requirements in inching operation.

The separate arrangement of the circuit from individual looms allows accordingly reduced size of each loom construction.

I claim:

1. A mass driver circuit for a group of weaving looms which are driven for substantially concurrent running comprising
   a commercial frequency power source having first power output line,
   a low frequency power unit connected to said commercial frequency power source, having second power output line and capable of lowering the frequency of the electric power supplied by said commercial frequency power source, and
   induction drive motors arranged, one for each, at said weaving looms, each said drive motor being connected to said first output line via a start switch and to said second output line via an inching switch so that each said drive motor should be selectively connected to said commercial frequency power source at normal running of each said weaving loom and to said low frequency power unit at inching operation of each said weaving loom.

2. A mass driver circuit for a group of weaving looms which are driven for substantially concurrent running, comprising:
   a commercial frequency power source having first power output line;
   a low frequency power unit connected to said commercial frequency power source, having second power output line and capable of lowering the frequency of the electric power supplied by said commercial frequency power source;
   drive motors arranged, one for each, at said weaving looms, each said drive motor being connected to said first output line via a start switch and to said second output line via an inching switch so that each said drive motor should be selectively connected to said commercial frequency power source at normal running of each said weaving loom and to said low frequency power unit at inching operation of each said weaving loom;
   a connection between each said drive motor and said first output line includes an individual driver circuit which includes a first relay, said start switch connected in series to said first relay, a stop switch connected in parallel to said start switch, a second relay arranged in parallel to said first relay and said inching switch connected in series to said second relay;
   a relay a-contact of said first relay, and
   a connection between each said drive motor and said second output line includes said individual driver circuit and a relay a-contact of said second relay,
   whereby said relay a-contact of said first relay is closed to electrically connect each said drive motor to said commercial frequency power source via said first power output line when said start switch is turned on whereas said relay a-contact of said second relay is closed to electrically connect each said drive motor to said low frequency power unit via said second power output line.

3. A mass driver circuit for a group of weaving looms which are driven for substantially concurrent running, comprising:
   a commercial frequency power source having first power output line;
   an inverter connected to said commercial frequency power source, having second power output line and capable of lowering the frequency of the electric power supplied by said commercial frequency power source, a voltage-frequency ratio of said inverter is enlarged for low frequencies, and
   drive motors arranged, one for each, at said weaving looms, each said drive motor being connected to said output line via a start switch and to said second output line via an inching switch so that each said drive motor should be selectively connected to said commercial frequency power source at normal running of each said weave loom and to said low frequency power unit at inching operation of each said weaving loom.

4. A mass driver as claimed in claim 1 in which said low frequency power unit is given in the form of an inverter.

* * * * *